(12) United States Patent
Rutkowski et al.

(10) Patent No.: US 12,242,671 B2
(45) Date of Patent: Mar. 4, 2025

(54) BRAKING CONTROL OF HAPTIC FEEDBACK DEVICE

(71) Applicant: QUALCOMM Incorporated, San Diego, CA (US)

(72) Inventors: Joseph Dale Rutkowski, Chandler, AZ (US); Joshua Zazzera, Chandler, AZ (US); Milind Sawant, Morgan Hill, CA (US); Shivaprakash Halagur, Singapore (SG)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 18/003,132

(22) PCT Filed: Jan. 5, 2021

(86) PCT No.: PCT/US2021/070002
§ 371 (c)(1),
(2) Date: Dec. 22, 2022

(87) PCT Pub. No.: WO2022/047438
PCT Pub. Date: Mar. 3, 2022

(65) Prior Publication Data
US 2023/0251715 A1    Aug. 10, 2023

(30) Foreign Application Priority Data
Aug. 27, 2020   (IN) .............................. 202021036917

(51) Int. Cl.
*G06F 3/01*   (2006.01)
*H02P 6/00*   (2016.01)

(52) U.S. Cl.
CPC ............. *G06F 3/016* (2013.01); *H02P 6/006* (2013.01)

(58) Field of Classification Search
CPC .. G06F 3/016; G06F 2203/013; H02P 25/032; H02P 25/034; H02P 25/06; H02P 6/006; H02P 6/182; H02P 3/12; H02P 3/18; B06B 1/0261
See application file for complete search history.

(56) References Cited

U.S. PATENT DOCUMENTS

| | | | |
|---|---|---|---|
| 11,336,216 B1* | 5/2022 | Dementyev | H02P 6/182 |
| 2007/0216325 A1* | 9/2007 | Fukamizu | H02P 6/21 318/400.34 |
| 2010/0153845 A1* | 6/2010 | Gregorio | G06F 3/016 715/702 |

(Continued)

*Primary Examiner* — Nitin Patel
*Assistant Examiner* — Amen W Bogale
(74) *Attorney, Agent, or Firm* — QUALCOMM Incorporated

(57) ABSTRACT

In some aspects, a controller may obtain a back electromotive force (BEMF) signal associated with a haptic feedback component, wherein the BEMF signal is generated by movement of the haptic feedback component. The controller may determine a time length for the BEMF signal to cross an amplitude-based window. The controller may determine, based on the time length, a braking amplitude for a control signal to reduce an energy level of the haptic feedback component. The controller may control the control signal according to the braking amplitude. Numerous other aspects are provided.

30 Claims, 8 Drawing Sheets

(56) References Cited

U.S. PATENT DOCUMENTS

| | | | | |
|---|---|---|---|---|
| 2011/0163985 A1* | 7/2011 | Bae | ............... | G06F 3/016 |
| | | | | 345/173 |
| 2013/0194084 A1* | 8/2013 | Lacroix | ............ | G06F 3/016 |
| | | | | 340/407.1 |
| 2013/0264973 A1* | 10/2013 | Garg | ............ | H02P 7/025 |
| | | | | 318/130 |
| 2015/0137713 A1* | 5/2015 | Barsilai | ............ | H02P 25/06 |
| | | | | 318/114 |
| 2015/0204925 A1* | 7/2015 | Hernandez | ........ | G01R 27/02 |
| | | | | 702/65 |
| 2015/0220148 A1* | 8/2015 | Gregorio | ........ | G06F 3/041 |
| | | | | 340/407.2 |
| 2016/0103492 A1* | 4/2016 | Billington | ........ | G06F 3/016 |
| | | | | 318/114 |
| 2017/0063273 A1* | 3/2017 | Murata | ........... | H02P 25/06 |
| 2018/0159457 A1* | 6/2018 | Eke | ............... | H03L 5/00 |
| 2020/0389113 A1* | 12/2020 | Palit | ............. | H02P 25/06 |
| 2020/0403546 A1* | 12/2020 | Janko | ............. | G08B 6/00 |
| 2021/0034158 A1* | 2/2021 | Lee | ............... | G08B 6/00 |
| 2021/0260621 A1* | 8/2021 | Lee | ............... | G06F 3/016 |
| 2021/0328535 A1* | 10/2021 | Khenkin | ........... | H02P 25/034 |
| 2022/0408181 A1* | 12/2022 | Hendrix | ........... | H03F 1/56 |
| 2023/0188061 A1* | 6/2023 | Lee | ............... | B06B 1/0261 |
| | | | | 318/135 |

* cited by examiner

BRAKING CONTROL OF HAPTIC FEEDBACK DEVICE

CROSS-REFERENCE TO RELATED APPLICATIONS

This Patent Application is a 371 national stage of PCT Application No. PCT/US2021/070002 filed on Jan. 5, 2021, entitled "BRAKING CONTROL OF HAPTIC FEEDBACK DEVICE," which claims priority to India Patent Application No. 202021036917, filed on Aug. 27, 2020, entitled "BRAKING CONTROL OF HAPTIC FEEDBACK DEVICE," and assigned to the assignee hereof. The disclosure of the prior Applications are considered part of and incorporated by reference into this Patent Application.

FIELD OF THE DISCLOSURE

Aspects of the present disclosure generally relate to haptic devices and, for example, to braking control of a haptic device.

BACKGROUND

A haptic device may create an experience of touch for a user by applying forces, vibrations, or motions to the user. The haptic device may apply the forces, vibrations, or motions to the user via physical contact with the user.

SUMMARY

In some aspects, a method may include obtaining, by a controller, a back electromotive force (BEMF) signal associated with a haptic feedback component, wherein the BEMF signal is generated by movement of the haptic feedback component; determining, by the controller, a time length for the BEMF signal to cross an amplitude-based window; determining, by the controller and based on the time length, a braking amplitude for a control signal to reduce an energy level of the haptic feedback component; and controlling, by the controller, the control signal according to the braking amplitude.

In some aspects, a method may include obtaining, by a controller, a movement profile for controlling a haptic output of a haptic feedback component using a control signal; determining, by the controller and during a half-cycle of the control signal, that an energy level of the haptic feedback component is to be reduced based on the movement profile; determining, by the controller, a quantification of the energy level of the haptic feedback component, based on a time length for a BEMF signal to cross an amplitude-based window; and adjusting, by the controller and based on the quantification, an amplitude of the control signal to reduce the energy level according to the movement profile.

In some aspects, a controller may include one or more memories and one or more processors, communicatively coupled to the one or more memories, configured to: obtain a BEMF signal associated with a haptic feedback component, wherein the BEMF signal is generated by movement of the haptic feedback component; determine a time length for the BEMF signal to cross an amplitude-based window; determine, based on the time length, a braking amplitude for a control signal to reduce an energy level of the haptic feedback component; and control the control signal according to the braking amplitude.

In some aspects, a controller may include one or more memories and one or more processors, communicatively coupled to the one or more memories, configured to: obtain a movement profile for controlling a haptic output of a haptic feedback component using a control signal; determine, during a half-cycle of the control signal, that an energy level of a haptic feedback component is to be reduced based on the movement profile; determine a quantification of the energy level of the haptic feedback component, based on a time length for a BEMF signal to cross an amplitude-based window; and adjust, based on the quantification, an amplitude of the control signal to reduce the energy level according to the movement profile.

In some aspects, a non-transitory computer-readable medium may store a set of instructions includes: one or more instructions that, when executed by one or more processors of a controller, cause the controller to: obtain a BEMF signal associated with a haptic feedback component, wherein the BEMF signal is generated by movement of the haptic feedback component; determine a time length for the BEMF signal to cross an amplitude-based window; determine, based on the time length, a braking amplitude for a control signal to reduce an energy level of the haptic feedback component; and control the control signal according to the braking amplitude.

In some aspects, a non-transitory computer-readable medium may store a set of instructions includes: one or more instructions that, when executed by one or more processors of a controller, cause the controller to: obtain a movement profile for controlling a haptic output of a haptic feedback component using a control signal; determine, during a half-cycle of the control signal, that an energy level of a haptic feedback component is to be reduced based on the movement profile; determine a quantification of the energy level of the haptic feedback component, based on a time length for a BEMF signal to cross an amplitude-based window; and adjust, based on the quantification, an amplitude of the control signal to reduce the energy level according to the movement profile.

In some aspects, an apparatus may include: means for obtaining a BEMF signal associated with a haptic feedback component, wherein the BEMF signal is generated by movement of the haptic feedback component; means for determining a time length for the BEMF signal to cross an amplitude-based window; means for determining, based on the time length, a braking amplitude for a control signal to reduce an energy level of the haptic feedback component; and means for controlling the control signal according to the braking amplitude.

In some aspects, an apparatus may include: means for obtaining a movement profile for controlling a haptic output of a haptic feedback component using a control signal; means for determining, during a half-cycle of the control signal, that an energy level of a haptic feedback component is to be reduced based on the movement profile; means for determining a quantification of the energy level of the haptic feedback component, based on a time length for a BEMF signal to cross an amplitude-based window; and means for adjusting, based on the quantification, an amplitude of the control signal to reduce the energy level according to the movement profile.

In some aspects, a method, device, apparatus, computer program product, non-transitory computer-readable medium, user equipment, base station, node, wireless communication device, and/or processing system as substantially described herein with reference to and as illustrated by the accompanying drawings and specification.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
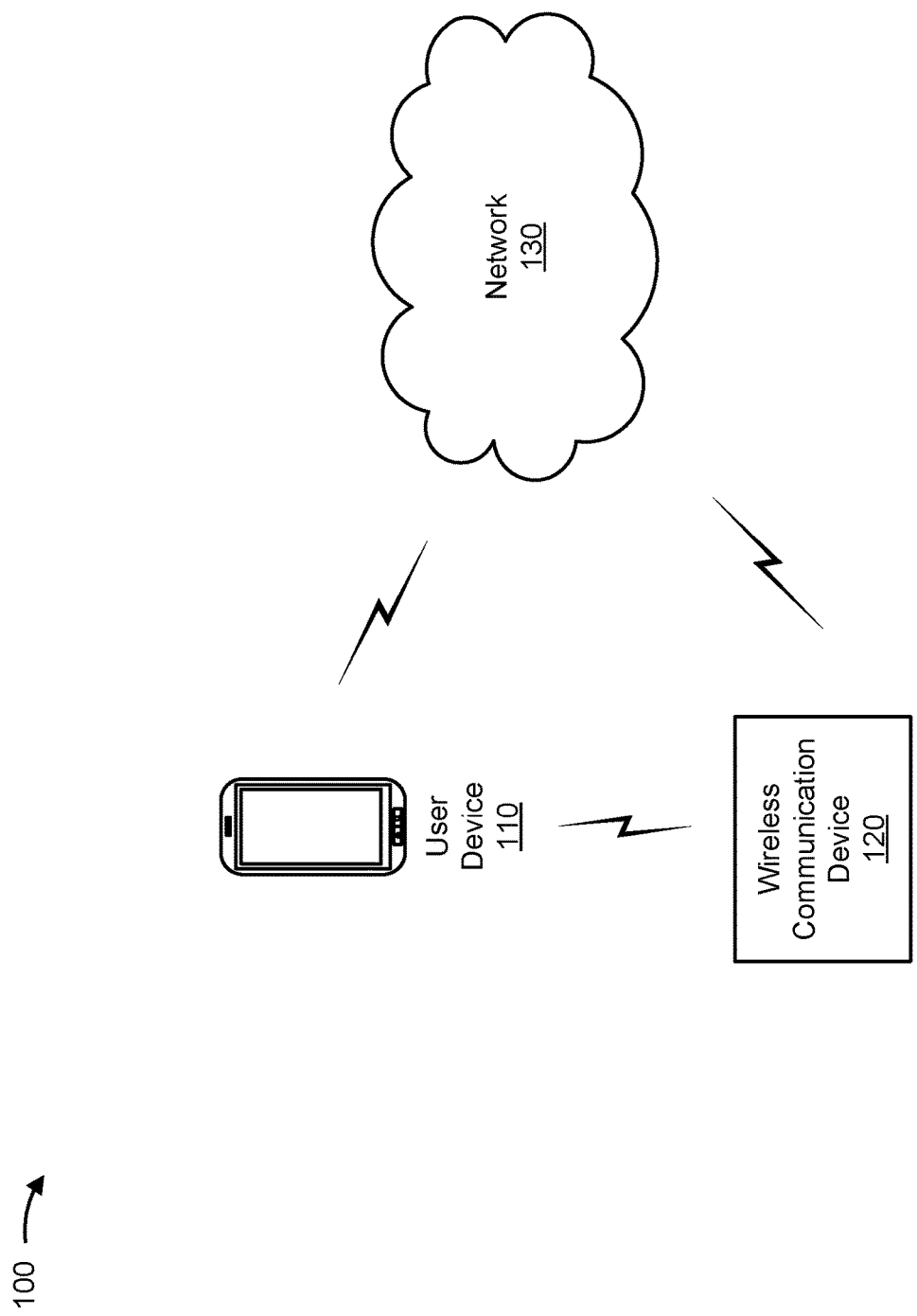
FIG. 1 is a diagram illustrating an example environment in which braking control of a haptic device described herein may be implemented, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

A haptic feedback device may generate haptic feedback based at least in part on an electrical input. The electrical input may include a voltage waveform, a current waveform, and/or the like. The haptic feedback device may convert the electrical input to a mechanical output as the haptic feedback, which may include a vibration, force feedback, or other types of haptic feedback. When the electrical input is removed, the haptic feedback device may continue to generate haptic feedback.

For example, the haptic feedback device may comprise a linear resonant actuator (LRA). The LRA may include a coil, a moving magnetic mass, and a spring. An input signal (e.g., an AC current) may be provided to the coil that remains stationary while producing a vibration and pressing against the magnetic mass, thereby driving the magnetic mass against the spring. When the input signal is removed, the haptic feedback device may continue to produce haptic feedback due to kinetic energy stored in the spring causing the magnetic mass to continue to move.

In some cases, active braking may be utilized to decrease the amount of time the haptic feedback device continues to produce haptic feedback after removing the input. Active braking may include applying a braking signal to the coil. The braking signal may cause the vibration of the coil to change a direction of movement of the magnetic mass to produce a force opposite to the oscillation of the spring, thereby decreasing an amount of time in which the spring will continue to cause the magnetic mass to move.

In some cases, an audio amplifier may be utilized to generate the braking signal. However, an audio amplifier may utilize a significant amount of hardware resources (e.g., a voltage analog-to-digital converter (ADC), a current ADC, an H-bridge power stage, and/or the like), may require significant signal processing to be performed, and may have an amount of latency associated with applying the braking signal.

Some implementations described herein enable braking control of a haptic feedback device. For example, a haptic feedback device may generate haptic feedback by causing a movement of a haptic feedback component (e.g., a magnetic mass). The movement of the haptic feedback component may generate a back electromotive force (BEMF) signal. A controller of the haptic feedback device may obtain the BEMF signal and may determine an amount of time for the BEMF signal to cross an amplitude-based window. For example, the controller may obtain the BEMF signal based on monitoring a voltage associated with the BEMF signal. The amplitude-based window may be defined based on an amplitude of the BEMF signal. For example, the BEMF signal may enter the amplitude-based window when the amplitude of the BEMF signal comprises a first value and may exit the amplitude-based window when the amplitude of the BEMF signal comprises a second value. In some implementations, the amplitude-based window is less than a peak BEMF signal in a given cycle. In some implementations, the amplitude-based window is less than one-half of a minimum BEMF signal in a given cycle. The controller may determine, based on the time length, an amplitude for a control signal (e.g., a braking signal) to reduce an energy level of the haptic feedback component. The controller may apply the control signal according to the braking amplitude.

In this way, the controller may apply a control signal having an amplitude that is determined based on an amount of energy stored in the haptic feedback component, thereby reducing an amount of time that the haptic feedback component continues to produce haptic feedback after the input signal is removed. Further, by utilizing the amount of time for the BEMF signal to cross the amplitude-based window to determine the amplitude of the braking signal, the haptic feedback device may produce improved haptic feedback having a crisper sensation and may utilize fewer hardware resources and/or computing resources (e.g., processing resources, memory resources, communication resources, and/or the like) relative to other methods for performing active braking.

FIG. 1 is a diagram of an example environment 100 in which systems and/or methods described herein may be implemented. As shown in FIG. 1, environment 100 may include a user device 110, a wireless communication device 120, and a network 130. Devices of environment 100 may interconnect via wired connections, wireless connections, or a combination of wired and wireless connections.

User device 110 includes one or more devices capable of receiving, generating, storing, processing, and/or providing information associated with braking control for a haptic feedback device, as described elsewhere herein. User device 110 may include a communication device and/or a computing device. For example, user device 110 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 110 may be a stand-alone device that includes a haptic feedback device for providing haptic feedback to a user, as described elsewhere herein.

Similar to user device 110, wireless communication device 120 includes one or more devices capable of receiving, generating, storing, processing, and/or providing information associated with braking control for a haptic feedback device, as described elsewhere herein. For example, wireless communication device 120 may include a base station, an access point, and/or the like. Additionally, or alternatively, similar to user device 110, wireless communication device 120 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Network 130 includes one or more wired and/or wireless networks. For example, network 130 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
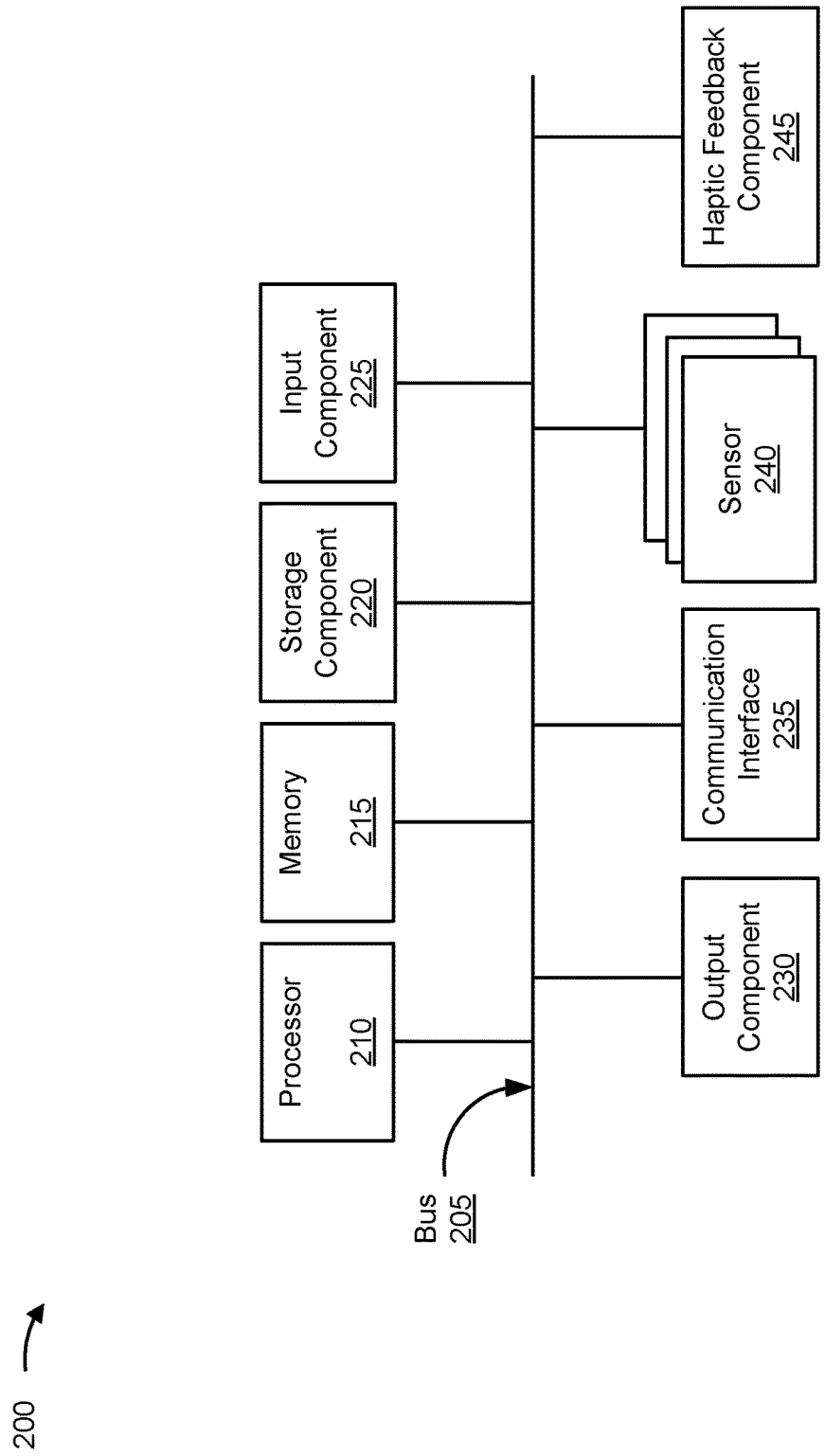
FIG. 2 is a diagram illustrating example components of one or more devices shown in FIG. 1, such as a user device and/or a wireless communication device, in accordance with various aspects of the present disclosure.

FIG. 2 is a diagram illustrating example components of a device 200, in accordance with various aspects of the present disclosure. Device 200 may correspond to user device 110 and/or wireless communication device 120. In some aspects, user device 110 and/or wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, a sensor 240, a haptic feedback component 245, and/or the like.

Bus 205 includes a component that permits communication among the components of device 200. Processor 210 is implemented in hardware, firmware, software, or a combination of hardware, firmware, and software. Processor 210 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component, a global navigation satellite system (GNSS) component, and/or the like) a sensor for sensing information (e.g., an accelerometer, a gyroscope, an actuator, another type of position or environment sensor, and/or the like)). Output component 230 includes a component that provides output information from device 200 (e.g., a display, a speaker, a haptic feedback component, an audio or visual indicator, and/or the like).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), a cellular network interface, and/or the like.

Sensor 240 includes one or more devices capable of sensing characteristics associated with device 200. Sensor 240 may include one or more integrated circuits (e.g., on a packaged silicon die) and/or one or more passive components of one or more flex circuits to enable communication with one or more components of device 200.

Sensor 240 may include an optical sensor that has a field of view in which sensor 240 may determine one or more characteristics of an environment of device 200. In some aspects, sensor 240 may include a camera. For example, sensor 240 may include a low-resolution camera (e.g., a video graphics array (VGA)) that is capable of capturing images that are less than one megapixel, images that are less than 1216×912 pixels, and/or the like. Sensor 240 may be a low-power device (e.g., a device that consumes less than ten milliwatts (mW) of power) that has always-on capability while device 200 is powered on.

Additionally, or alternatively, sensor 240 may include a magnetometer (e.g., a Hall effect sensor, an anisotropic magneto-resistive (AMR) sensor, a giant magneto-resistive sensor (GMR), and/or the like), a location sensor (e.g., a global positioning system (GPS) receiver, a local positioning system (LPS) device (e.g., that uses triangulation, multi-lateration, and/or the like), and/or the like), a gyroscope (e.g., a micro-electro-mechanical systems (MEMS) gyroscope or a similar type of device), an accelerometer, a speed sensor, a motion sensor, an infrared sensor, a temperature sensor, a pressure sensor, and/or the like.

Haptic feedback component 245 includes one or more types of haptic feedback devices or components that are capable of generating haptic feedback, a haptic response, or another type of haptic output. For example, haptic feedback component 245 may be capable of receiving an input and may be capable of generating haptic feedback based at least in part on the input, which may include a vibration output or pattern, force feedback, ultrasonic-induced pressure, or another type of haptic feedback or output. Examples of haptic feedback components include a linear resonance actuator, an eccentric rotating mass motor, a piezoelectric actuator, and/or the like.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for obtaining a movement profile for controlling a haptic output of a haptic feedback component using a control signal; means for determining, during a half-cycle of the control signal, that an energy level of a haptic feedback component is to be reduced based on the movement profile; means for determining a quantification of the energy level of the haptic feedback component, based on a time length for a BEMF signal to cross an amplitude-based window; means for adjusting, based on the quantification, an amplitude of the control signal to reduce the energy level according to the movement profile. In some aspects, such means may include one or more components of device 200 described in connection with FIG. 2, such as bus 205, processor 210, memory 215, storage component 220, input component 225, output component 230, communication interface 235, sensor 240, haptic feedback component 245, and/or the like.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
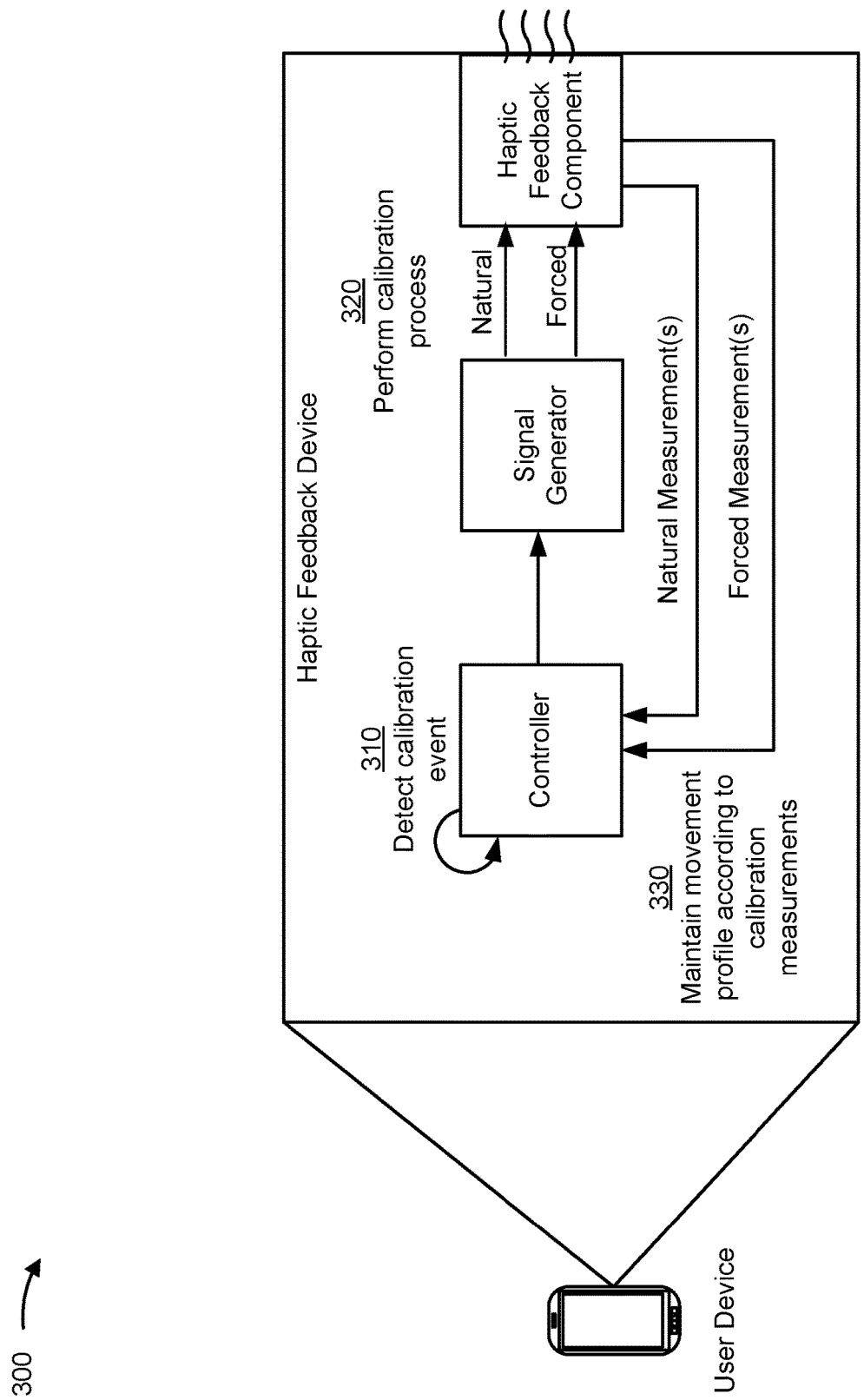
FIGS. 3, 4A, and 4B are diagrams illustrating examples associated with braking control of a haptic device, in accordance with various aspects of the present disclosure.

FIG. 3 is a diagram illustrating an example 300 associated with braking control for a haptic feedback device, in accordance with various aspects of the present disclosure. As shown in FIG. 3, example 300 includes a user device (e.g., user device 110, wireless communication device 120, and/or the like) that includes a haptic feedback device for providing haptic feedback to a user of the user device. The haptic feedback device may include a controller, a signal generator, and a haptic feedback component. In some implementations, the haptic feedback device comprises a linear resonant actuator (LRA) and the haptic feedback component includes a coil, a movable magnetic mass, and a spring.

As shown by reference number 310, the haptic feedback device detects a calibration event. The calibration event may comprise a particular, repeated event for which haptic feedback is provided. For example, the haptic feedback device may be included in a user device and the calibration event may comprise the user device being powered on, the user device being unlocked or accessed by a user, the user device receiving a phone call, a text message, a notification, and/or the like.

The haptic feedback device may detect the calibration event based on receiving haptic control information associated with the calibration event. For example, a processor of the user device may determine an occurrence of the calibration event and may cause haptic control information associated with the calibration event to be provided to the haptic feedback device.

The haptic control information may include information associated with controlling a haptic output of the haptic feedback component (e.g., for controlling a movement of the haptic feedback component) using a control signal. For example, the haptic control information may include information identifying a movement profile associated with the calibration event. The movement profile may include information for controlling the haptic output of the haptic feedback component to cause the haptic feedback component to output a pattern of haptic feedback associated with the calibration event.

The movement profile may include information indicating a set of characteristics of a control signal to be provided to the haptic feedback component to cause the haptic feedback component to output the pattern of haptic feedback. The set of characteristics may include information identifying an amplitude of the control signal, information identifying a frequency of the control signal, information identifying a period of time for which the control signal is to be provided to the haptic feedback component, information indicating a time period for which no haptic feedback is to be provided, information indicating a quantity of times that the control signal is to be provided to the haptic feedback component, and/or the like.

The haptic feedback device (e.g., the signal generator) may generate the control signal based on the movement profile and may provide the control signal to the haptic feedback component. The haptic feedback device may provide the control signal to the haptic feedback component based on the movement profile to cause the haptic feedback component to output the pattern of haptic feedback.

As shown by reference number 320, the haptic feedback device (e.g., the controller) performs a calibration process. The haptic feedback device may perform the calibration process based on the movement profile. The haptic feedback device may determine that an energy level of the haptic feedback component is to be reduced for a period of time (e.g., a period of time corresponding to a half-cycle of the control signal, a period of time corresponding to a cycle of the control signal, a period of time corresponding to two cycles of the control signal, and/or the like) based on the movement profile. For example, the haptic feedback device may determine that the movement profile indicates that stoppage of the movement of the haptic feedback component is to be initiated in a next cycle of the control signal.

The haptic feedback device may determine a quantification of the energy level of the haptic feedback component based on a time length for a BEMF signal to cross an amplitude-based window (e.g., a voltage window, a current window, and/or the like). The BEMF signal may be generated by movement of the haptic feedback component. The haptic feedback device may determine the quantification at a time corresponding to a time at which the reduction of the energy level is to be initiated according to the movement profile.

As an example, the movement profile may indicate that haptic feedback is not to be generated during a time period (e.g., a time period corresponding to one or more cycles of the control signal). The haptic feedback device may set the control signal to a high impedance setting during the time period. The haptic feedback device may set the control signal to the high impedance setting to cause the reduction of the energy level of the haptic feedback component.

The haptic feedback device may obtain a first measurement of a natural response of the haptic feedback component based on the BEMF signal. The haptic feedback device may obtain the first measurement during a first BEMF measurement period. The first BEMF measurement period may correspond to a half-cycle of the control signal immediately following the control signal being set to the high-impedance setting.

The first measurement may include an amount of time for the BEMF signal to cross through the amplitude-based window. For example, the haptic feedback device may monitor a voltage of the BEMF signal. The haptic feedback device may determine that the voltage has a first value. The haptic feedback device may determine that the BEMF signal enters the amplitude-based window based on the voltage comprising the first value. The haptic feedback device may determine that the BEMF signal crosses through the amplitude-based window when the voltage comprises a second value. In some implementations, the amplitude-based window is less than a peak BEMF signal in a given cycle. In some implementations, the amplitude-based window is less than one-half of a minimum BEMF signal in a given cycle. The haptic feedback device may determine the first measurement based on an amount of time associated with the BEMF signal crossing through the amplitude-based window.

In some implementations, the haptic feedback device utilizes a plurality of comparators (e.g., two, three, and/or the like) and a clock to determine the first measurement. The haptic feedback device may utilize the plurality of comparators to determine a time-based analog-to-digital conversion (ADC) to quantify a duration of time associated with the BEMF signal crossing through the amplitude-based window. The haptic feedback device may determine an amplitude of the BEMF signal based on the amount of time associated with the BEMF signal crossing through the amplitude-based window. The amplitude of the BEMF signal may be inversely proportional to the amount of time associated with the BEMF signal crossing through the amplitude-based window. In this way, the haptic feedback device may reduce and/or eliminate latency associated with determining an amplitude of the BEMF signal and/or an amplitude of a braking signal, as described below.

The haptic feedback device may determine changes in the polarity of the BEMF signal based on an output of the plurality of comparators and/or the time-based ADC. The haptic feedback device may determine a phase of the BEMF signal based on the changes in polarity of the BEMF signal. By determining the phase of the BEMF signal, the haptic feedback device may synchronize a braking signal applied to the haptic feedback component with the BEMF signal. In this way, the haptic feedback device may cause the movement of the magnetic mass to be opposite to a force applied by the spring. Alternatively, and/or additionally, the haptic feedback device may determine a resonant frequency associated with the haptic feedback component based on the amount of time it takes for the BEMF signal to cross through the amplitude-based window and/or the phase of the BEMF signal.

The haptic feedback device may obtain a second measurement of the natural response of the haptic feedback component during a second BEMF measurement period. The second BEMF measurement period may correspond to a period of time immediately following one cycle of the control signal after setting the control signal to the high-impedance setting. The second measurement may include an amount of time for the BEMF signal to travel through the amplitude-based window. The haptic feedback device may determine the second measurement in a manner similar to that described above.

The haptic feedback device may determine a third measurement of an active braking response of the haptic feedback component during a third BEMF period. The third BEMF period may correspond to a period of time immediately following setting the control signal to the high impedance setting and/or providing a braking signal to the haptic feedback component. As an example, after determining the second measurement, the haptic feedback device may determine that the energy level of the haptic feedback component is to be increased for a period of time based on the movement profile. The haptic feedback device may set the control signal to a low-impedance setting based on determining that the energy level of the haptic feedback component is to be increased for the period of time.

Subsequently, the haptic feedback device may determine that the energy level of the haptic feedback component is to be reduced for a period of time based on the movement profile. The haptic feedback device may set the control setting to the high impedance setting and/or may provide a braking signal to the haptic feedback component based on determining that the energy level of the haptic feedback component is to be reduced for the period of time. In some implementations, the haptic feedback device sets the control signal to the high-impedance setting and then provides the braking signal when the BEMF signal crosses the amplitude-based window.

The haptic feedback device may generate the braking signal based on converting the control signal from a drive signal that increases the energy level of the haptic feedback component to a braking signal that reduces the energy level. For example, the haptic feedback device may invert a phase of the control signal to generate the braking signal. The haptic feedback device may set a frequency of the braking signal to a resonant frequency of the haptic feedback component. The resonant frequency of the haptic feedback component may be determined based on the BEMF signal, as described in greater detail below. The haptic feedback device may set an amplitude of the braking signal to a braking amplitude. The haptic feedback device may determine the braking amplitude as described in greater detail below.

The haptic feedback device may determine the third measurement during the third BEMF measurement period based on providing the braking signal to the haptic feedback component. The third measurement may correspond to an amount of time for the BEMF signal to cross through the amplitude-based window. The haptic feedback device may determine the third measurement in a manner similar to that described above.

The haptic feedback device may obtain a fourth measurement of the active braking response of the haptic feedback component during a fourth BEMF measurement period. The fourth BEMF measurement period may correspond to a period of time immediately following one cycle of the control signal after the control signal is set to the high impedance setting and/or providing the braking signal. The fourth measurement may include an amount of time for the BEMF signal to travel through the amplitude-based window. The haptic feedback device may determine the fourth measurement in a manner similar to that described above.

The haptic feedback device may determine a natural reduction factor (Rcal) based on the first measurement (Twind_nat[0]) and the second measurement (Twind_nat[1]). The haptic feedback device may determine the natural reduction factor based on the following equation:

$$Rnat = \left[\left(1 - \frac{\text{Twind\_nat}[0]}{\text{Twind\_nat}[1]}\right)\right] \quad (1)$$

The haptic feedback device may determine a forced reduction factor (Rcal) based on the third measurement (Twind_cal[0]) and the fourth measurement (Twind_cal[1]). The haptic feedback device may determine the forced reduction factor based on the following equation:

$$Rcal = \left[\left(1 - \frac{\text{Twind\_cal}[0]}{\text{Twind\_cal}[1]}\right)\right] \quad (2)$$

The haptic feedback device may determine a desired braking amplitude (B[n]) to achieve a desired reduction (e.g., 100%, 95%, 80%, and/or the like) in the BEMF signal ($R_{set}$) based on the natural reduction factor, the forced reduction factor, the braking amplitude of the braking signal associated with determining the third and fourth measurements, and a measurement corresponding to an amount of time for the BEMF signal to cross through the amplitude-based window associated with the current pattern of haptic feedback being provided by the haptic feedback component. The haptic feedback device may determine the desired braking amplitude based on the following equation:

$$B[n] = \left[\frac{Bcal * \left[\frac{(Rset - Rnat) * \text{Twind\_cal}[0]}{\text{fullscale value}}\right]}{\left[\frac{(Rcal - Rnat) * Twind[n-1]}{\text{fullscale}}\right]}\right] \quad (3)$$

The haptic feedback device may determine the first, second, third, and fourth measurements based on the desired braking amplitude and may determine a new desired braking amplitude in a manner similar to that described above. The haptic feedback device may continue to determine the desired braking amplitude until the desired reduction in the BEMF signal is achieved.

As shown by reference number 330, the haptic feedback device maintains a movement profile according to the calibration measurements. For example, the haptic feedback device may store, in the movement profile associated with the calibration event, information indicating the desired braking amplitude associated with achieving the desired reduction in the BEMF signal, information identifying the resonant frequency associated with the haptic feedback component, information identifying the amplitude of the BEMF signal, and/or the like. The haptic feedback device may utilize the desired braking amplitude to perform active braking, as described in greater detail below.

As indicated above, FIG. 3 is provided as an example. Other examples may differ from what is described with respect to FIG. 3.

Figure 4A:
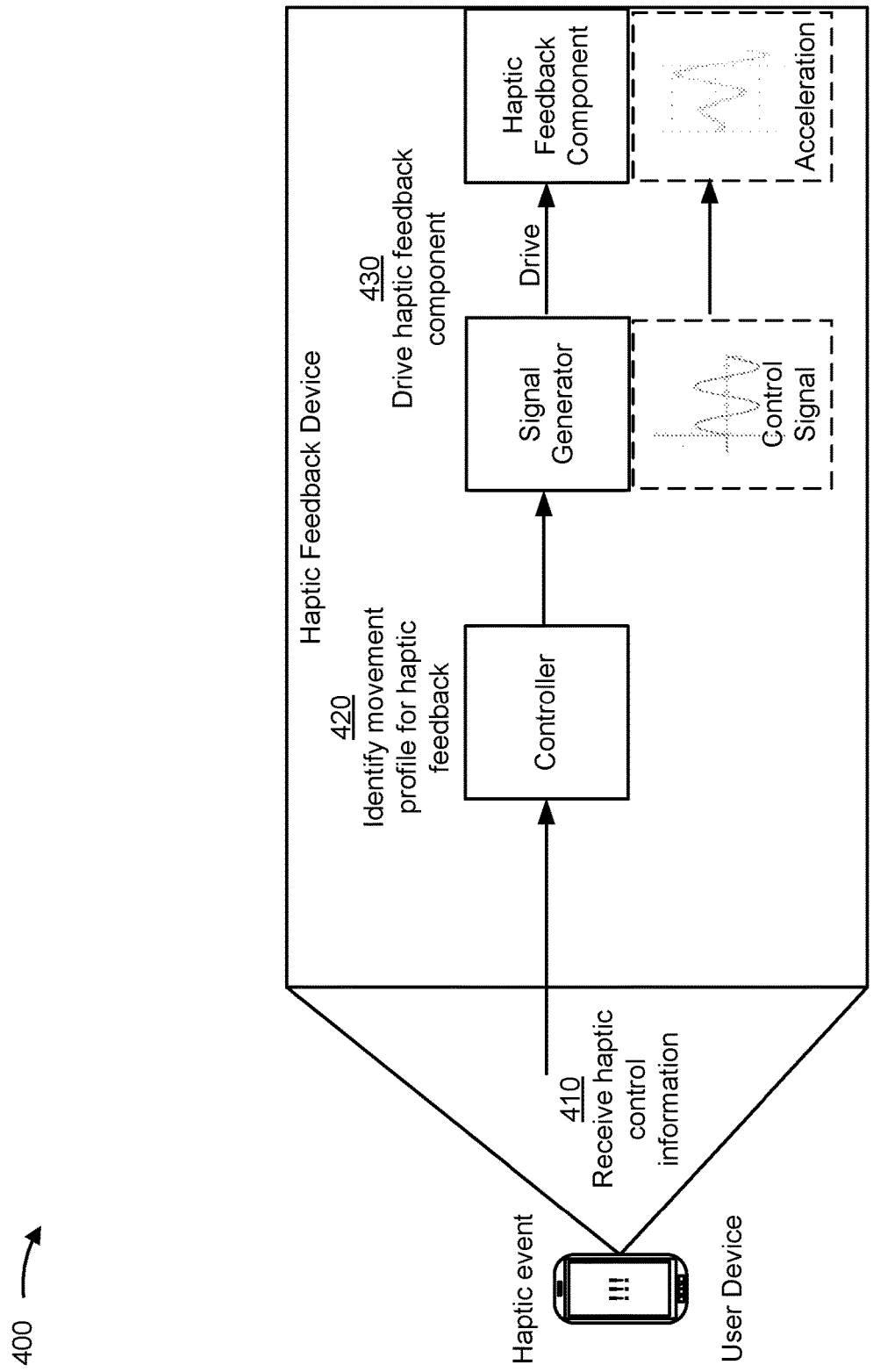
Figure 4B:
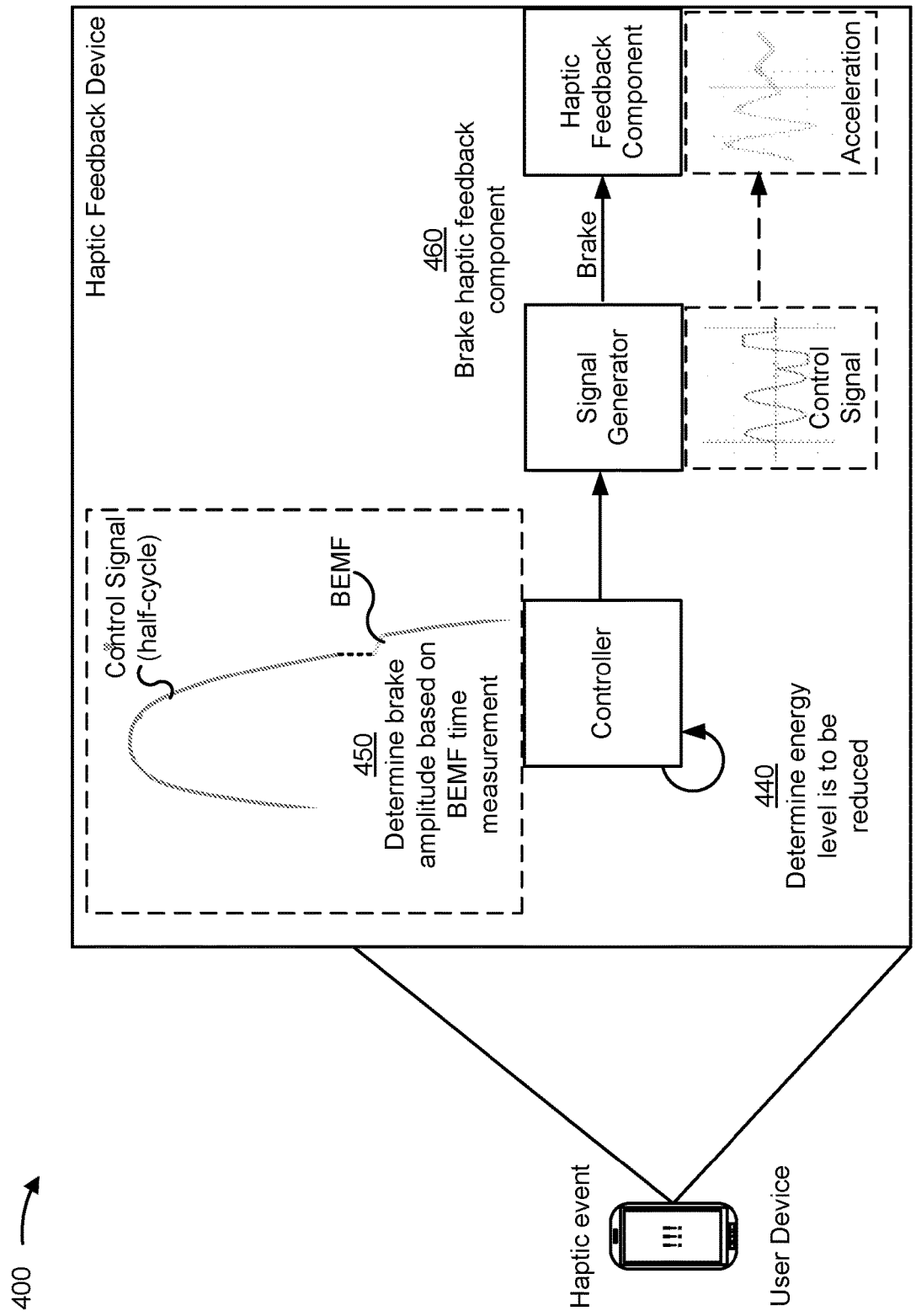

FIGS. 4A and 4B are diagrams illustrating an example 400 associated with braking control of a haptic feedback device, in accordance with various aspects of the present disclosure. As shown in FIGS. 4A and 4B, example 400 includes communication between a controller, a signal generator, and a haptic feedback component included in a haptic feedback device of a user device (e.g., user device 110, wireless communication device 120, and/or the like).

As shown in FIG. 4A, and by reference number 410, the haptic feedback device receives haptic control information. The haptic control information may be associated with controlling a haptic output of the haptic feedback component. For example, the haptic feedback device may be included in a user device. A component of the user device (e.g., a processor) may detect an event for which haptic feedback is to be provided. The component of the user device may provide the haptic control information to the haptic feedback device based on detecting the event for which the haptic feedback is to be provided.

As shown by reference number 420, the haptic feedback device identifies a movement profile for haptic feedback.

The controller may identify, based on the haptic control information, a movement profile for controlling a haptic output of the haptic feedback component (e.g., for controlling a movement of the haptic feedback component) using a control signal. For example, the haptic control information may include the movement profile, information for obtaining the movement profile (e.g., a memory address), information identifying a type of event for which the haptic feedback is to be provided, and/or the like. The haptic feedback device may identify the movement profile based on the information included in the control information.

As shown by reference number 430, the haptic feedback device drives the haptic feedback component. The haptic feedback device may drive the haptic feedback component based on the movement profile. The haptic feedback device may provide a control signal to the haptic feedback component to drive the haptic feedback component based on the movement profile. In some implementations, the haptic feedback device provides the control signal to the haptic feedback component in a manner similar to that described above with respect to FIG. 3.

As shown in FIG. 4B, and by reference number 440, the haptic feedback device determines that the energy level is to be reduced. The controller may determine that an energy level of the haptic feedback component is to be reduced during a half-cycle of the control signal based on the movement profile. For example, the controller may determine that the movement profile indicates that stoppage of the movement of the haptic feedback component is to be initiated in a next cycle of the control signal. In some implementations, the haptic feedback device determines that the energy level is to be reduced in a manner similar to that described above with respect to FIG. 3.

As shown by reference number 450, the haptic feedback device determines a brake amplitude based on a BEMF time measurement. In some implementations, the haptic feedback device determines the brake amplitude in a manner similar to that described above with respect to FIG. 3 (e.g., by setting the control signal to a high impedance signal).

Additionally, or alternatively, to determine the brake amplitude, the haptic feedback device may reduce an amplitude of the control signal to a particular setting during a transition period that is prior to setting the control signal to a high impedance signal. For example, during the transition period, the haptic feedback device may set the control signal to have a voltage amplitude of 0 (zero) volts and/or have a voltage amplitude that is within a particular threshold of 0 volts. Additionally, or alternatively, the haptic feedback device may determine and cause (e.g., during the transition period) the control signal to have a voltage amplitude that causes zero current to flow through the haptic feedback component and/or a current with an amplitude that is within a particular threshold of 0 amps to flow through the haptic feedback component.

In some implementations, the haptic feedback device determines the brake amplitude based on the movement profile. The movement profile may include information identifying the brake amplitude. The haptic feedback device may analyze the movement profile and may determine the brake amplitude based on the analysis.

As shown by reference number 460, the haptic feedback device brakes the haptic feedback component. The haptic feedback device may brake the haptic feedback component by setting the control signal to a high impedance setting and/or applying a braking signal having an amplitude corresponding to the determined brake amplitude. Braking the haptic feedback component may cause the energy level of the haptic feedback component to be reduced. Reducing the energy level of the haptic feedback component may prevent the haptic feedback component from outputting the haptic feedback.

As indicated above, FIGS. 4A and 4B are provided as an example. Other examples may differ from what is described with respect to FIGS. 4A and 4B.

Figure 5:
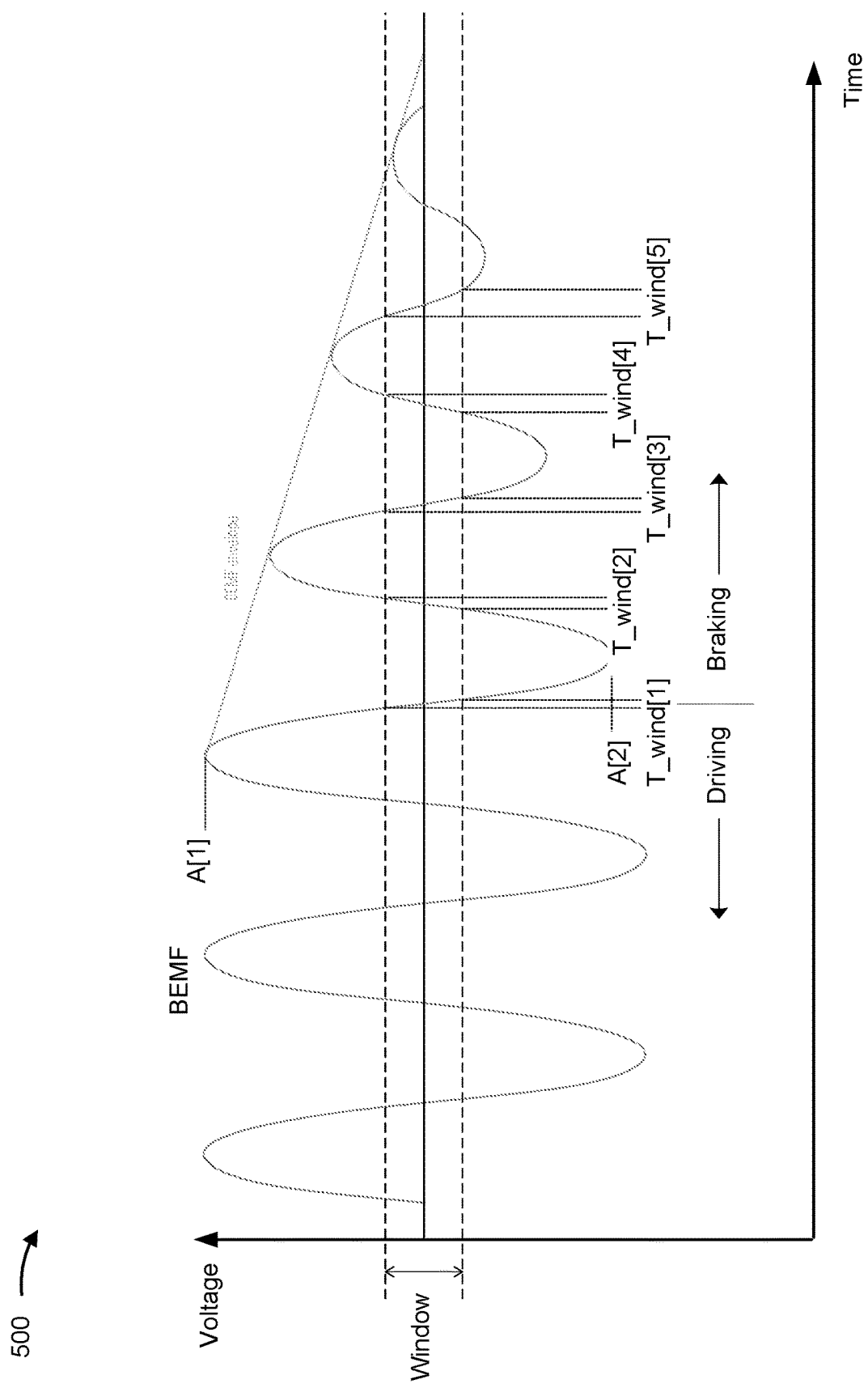
FIG. 5 is a graph illustrating a voltage of aback electromotive force signal with respect to time, in accordance with various aspects of the present disclosure.

FIG. 5 is a graph illustrating a voltage of a BEMF signal with respect to time, in accordance with various aspects of the present disclosure. As shown in FIG. 5, an amplitude of the BEMF signal may be relatively constant as a control signal is applied to the haptic feedback component (e.g., an amplitude of A[1], as shown in FIG. 5).

The haptic feedback device may determine to decrease an energy level of the haptic feedback component based on a movement profile and may set the control signal to a high-impedance setting, in a manner similar to that described above with respect to FIG. 3. As shown in FIG. 5, the amount of time for the BEMF signal to cross through the amplitude-based window is inversely proportional to the amplitude of the BEMF signal. Stated differently, as the amount of time for the BEMF signal to cross through the amplitude-based window increases, the amplitude of the BEMF signal decreases by a proportional amount. Thus, by determining the amount of time for the BEMF signal to cross through the amplitude-based window, the haptic feedback device is able to determine the amplitude of the BEMF signal for the period of time during which the BEMF signal crossed through the amplitude-based window.

As indicated above, FIG. 5 is provided as an example. Other examples may differ from what is described with respect to FIG. 5.

Figure 6:
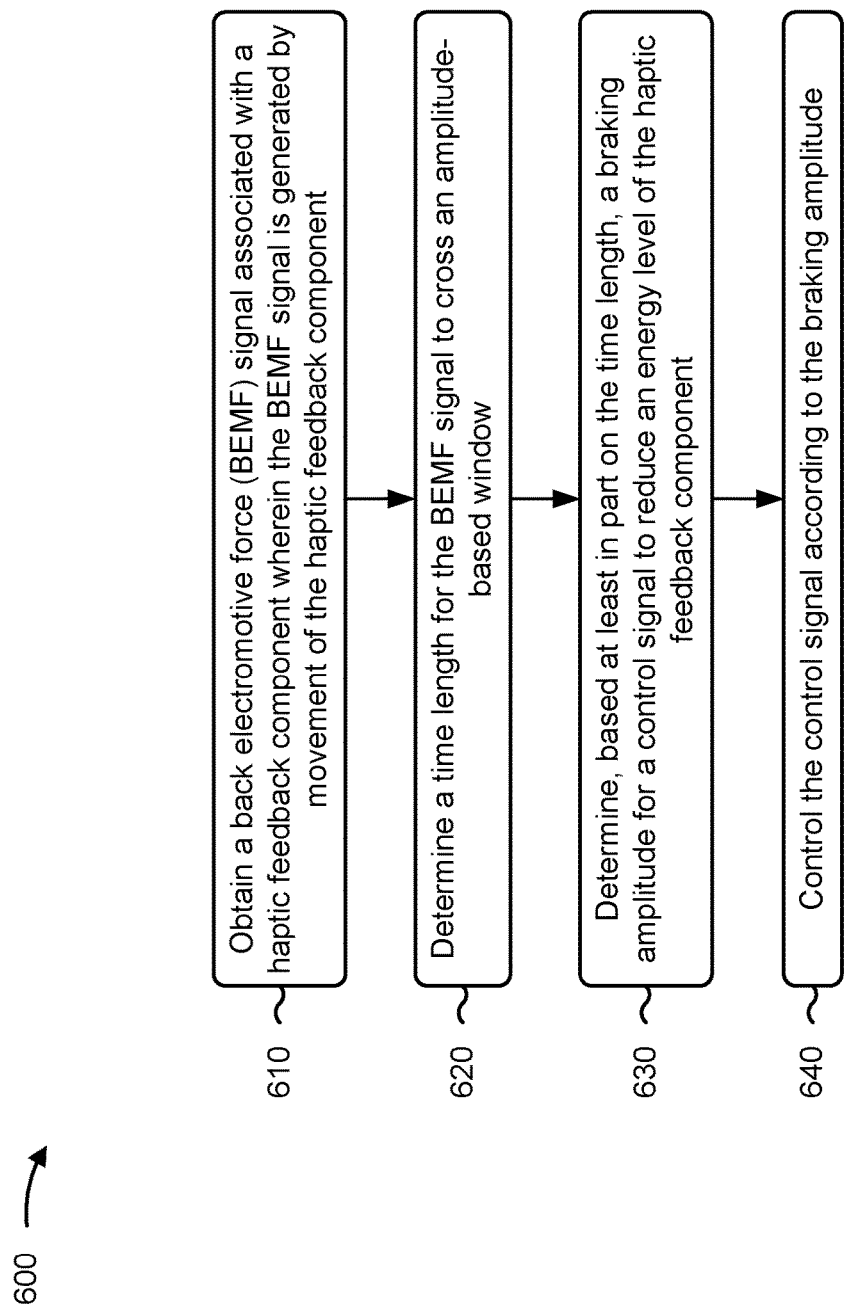
FIGS. 6 and 7 are flowcharts of example processes associated with a braking control of a haptic device, in accordance with various aspects of the present disclosure.

FIG. 6 is a diagram illustrating an example process 600 performed, for example, by a haptic feedback device, in accordance with various aspects of the present disclosure. Example process 600 is an example where the haptic feedback device (e.g., a processor, a signal generator, a haptic feedback component, and/or the like) performs operations associated with braking control of the haptic feedback device.

As shown in FIG. 6, in some aspects, process 600 may include obtaining a BEMF signal associated with a haptic feedback component, wherein the BEMF signal is generated by movement of the haptic feedback component (block 610). For example, the haptic feedback device (e.g., using the controller) may obtain a BEMF signal associated with a haptic feedback component, as described above. In some aspects, the BEMF signal is generated by movement of the haptic feedback component.

As further shown in FIG. 6, in some aspects, process 600 may include determining a time length for the BEMF signal to cross an amplitude-based window (block 620). For example, the haptic feedback device (e.g., using the controller) may determine a time length for the BEMF signal to cross an amplitude-based window, as described above.

As further shown in FIG. 6, in some aspects, process 600 may include determining, based on the time length, a braking amplitude for a control signal to reduce an energy level of the haptic feedback component (block 630). For example, the haptic feedback device (e.g., using the controller) may determine, based on the time length, a braking amplitude for a control signal to reduce an energy level of the haptic feedback component, as described above.

As further shown in FIG. 6, in some aspects, process 600 may include controlling the control signal according to the braking amplitude (block 640). For example, the haptic feedback device (e.g., using the controller) may control the control signal according to the braking amplitude, as described above.

Process 600 may include additional aspects, such as any single aspect or any combination of aspects described below and/or in connection with one or more other processes described elsewhere herein.

In a first aspect, process 600 includes receiving haptic control information associated with controlling a haptic output of a haptic feedback device, identifying, from the haptic control information, a movement profile associated with the movement of the haptic feedback component, and determining that the movement profile indicates that stoppage of the movement of the haptic feedback component is to be initiated in a next cycle of the control signal. The braking amplitude may be determined based on the movement profile indicating that the stoppage of the movement of the haptic feedback component is to be initiated in the next cycle of the control signal.

In a second aspect, alone or in combination with the first aspect, the BEMF signal is obtained in association with determining a resonant frequency of the haptic feedback component.

In a third aspect, alone or in combination with one or more of the first and second aspects, obtaining the BEMF signal comprises setting, during a BEMF measurement period of a half-cycle of the control signal, the control signal to a high-impedance setting, and measuring a voltage output of the haptic feedback component during the BEMF measurement period, wherein the BEMF signal corresponds to the voltage output of the haptic feedback component during the BEMF measurement period.

In a fourth aspect, alone or in combination with one or more of the first through third aspects, the control signal is controlled according to the braking amplitude during a next half-cycle of the control signal, that follows the half-cycle, to reduce the energy level of the haptic feedback component.

In a fifth aspect, alone or in combination with one or more of the first through fourth aspects, the time length to cross the amplitude-based window is associated with a peak amplitude of the BEMF signal.

In a sixth aspect, alone or in combination with one or more of the first through fifth aspects, the braking amplitude is determined to reduce the peak amplitude of the BEMF signal during a subsequent cycle of the BEMF signal.

In a seventh aspect, alone or in combination with one or more of the first through sixth aspects, determining the braking amplitude comprises determining the braking amplitude to be inversely proportional to the time length.

In an eighth aspect, alone or in combination with one or more of the first through seventh aspects, controlling the control signal according to the braking amplitude comprises setting an amplitude of the control signal to be the braking amplitude.

In a ninth aspect, alone or in combination with one or more of the first through eighth aspects, controlling the control signal according to the braking amplitude comprises converting the control signal from a drive signal that increases the energy level to a braking signal that reduces the energy level by inverting a phase of the drive signal to generate the braking signal, setting a frequency of the braking signal to a resonant frequency of the haptic feedback component that is based on the BEMF signal, setting an amplitude of the braking signal to the braking amplitude, and outputting the braking signal when the BEMF signal crosses the amplitude-based window.

In a tenth aspect, alone or in combination with one or more of the first through ninth aspects, the haptic feedback component comprises a linear resonant actuator.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
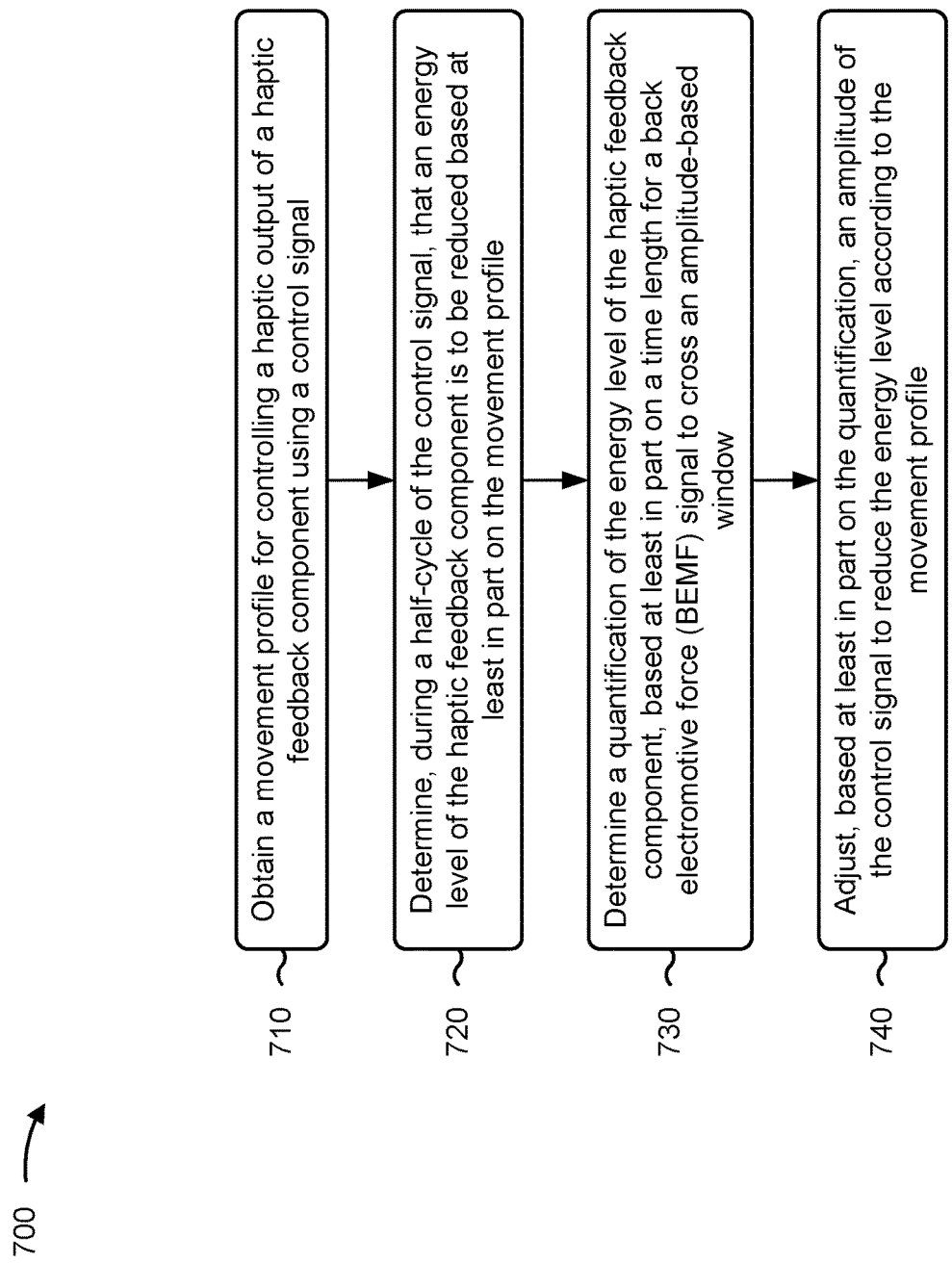

FIG. 7 is a diagram illustrating an example process 700 performed, for example, by a haptic feedback device, in accordance with various aspects of the present disclosure. Example process 700 is an example where the haptic feedback device (e.g., a controller, a signal generator, a haptic feedback component, and/or the like) performs operations associated with braking control of the haptic feedback device.

As shown in FIG. 7, in some aspects, process 700 may include obtaining a movement profile for controlling a haptic output of a haptic feedback component using a control signal (block 710). For example, the haptic feedback device (e.g., using the controller) may obtain a movement profile for controlling a haptic output of a haptic feedback component using a control signal, as described above.

As further shown in FIG. 7, in some aspects, process 700 may include determining, during a half-cycle of the control signal, that an energy level of the haptic feedback component is to be reduced based on the movement profile (block 720). For example, the haptic feedback device (e.g., using the controller) may determine, during a half-cycle of the control signal, that an energy level of the haptic feedback component is to be reduced based on the movement profile, as described above.

As further shown in FIG. 7, in some aspects, process 700 may include determining a quantification of the energy level of the haptic feedback component, based on a time length for a BEMF signal to cross an amplitude-based window (block 730). For example, the haptic feedback device (e.g., using the controller) may determine a quantification of the energy level of the haptic feedback component, based on a time length for a BEMF signal to cross an amplitude-based window, as described above.

As further shown in FIG. 7, in some aspects, process 700 may include adjusting, based on the quantification, an amplitude of the control signal to reduce the energy level according to the movement profile (block 740). For example, the haptic feedback device (e.g., using the controller) may adjust, based on the quantification, an amplitude of the control signal to reduce the energy level according to the movement profile, as described above.

Process 700 may include additional aspects, such as any single aspect or any combination of aspects described below and/or in connection with one or more other processes described elsewhere herein.

In a first aspect, the movement profile is obtained based on a calibration of the haptic feedback component that was performed prior to receiving haptic control information associated with generating the haptic output.

In a second aspect, alone or in combination with the first aspect, obtaining the movement profile comprises performing, prior to receiving haptic control information associated with generating the haptic output, a calibration process to calibrate the control signal specifically to reduce the energy level of the haptic feedback component based on characteristics of the haptic feedback component.

In a third aspect, alone or in combination with one or more of the first and second aspects, performing the calibration process comprises obtaining a first measurement of a natural response of the haptic feedback component based on a drive signal, obtaining a second measurement of a forced response of the haptic feedback component when a braking signal is applied to the haptic feedback component after the drive signal to reduce the energy level of the haptic feedback component during the calibration process, and calibrating the control signal for reducing the energy level based on the first measurement and the second measurement.

In a fourth aspect, alone or in combination with one or more of the first through third aspects, the quantification is determined when reduction of the energy level is to be initiated according to the movement profile.

In a fifth aspect, alone or in combination with one or more of the first through fourth aspects, the time length is measured during a half-cycle of the BEMF signal that corresponds to the half-cycle of the control signal.

In a sixth aspect, alone or in combination with one or more of the first through fifth aspects, the haptic feedback component comprises a linear resonant actuator.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some aspects of the present disclosure:

Aspect 1: A method comprising: obtaining, by a controller, a back electromotive force (BEMF) signal associated with a haptic feedback component, wherein the BEMF signal is generated by movement of the haptic feedback component; determining, by the controller, a time length for the BEMF signal to cross an amplitude-based window; determining, by the controller and based on the time length, a braking amplitude for a control signal to reduce an energy level of the haptic feedback component; and controlling, by the controller, the control signal according to the braking amplitude.

Aspect 2: The method of aspect 1, further comprising, prior to determining the braking amplitude: receiving haptic control information associated with controlling a haptic output of a haptic feedback device; identifying, from the haptic control information, a movement profile associated with the movement of the haptic feedback component; and determining that the movement profile indicates that stoppage of the movement of the haptic feedback component is to be initiated in a next cycle of the control signal, wherein the braking amplitude is determined based on the movement profile indicating that the stoppage of the movement of the haptic feedback component is to be initiated in the next cycle of the control signal.

Aspect 3: The method of aspect 1 or 2, wherein the BEMF signal is obtained in association with determining a resonant frequency of the haptic feedback component.

Aspect 4: The method of any of aspects 1 to 3, wherein obtaining the BEMF signal comprises: setting, during a BEMF measurement period of a half-cycle of the control signal, the control signal to a high-impedance setting; and measuring a voltage output of the haptic feedback component during the BEMF measurement period, wherein the BEMF signal corresponds to the voltage output of the haptic feedback component during the BEMF measurement period.

Aspect 5: The method of aspect 4, wherein the control signal is controlled according to the braking amplitude during a next half-cycle of the control signal, that follows the half-cycle, to reduce the energy level of the haptic feedback component.

Aspect 6: The method of any of aspects 1 to 5, wherein the time length to cross the amplitude-based window is associated with a peak amplitude of the BEMF signal.

Aspect 7: The method of aspect 6, wherein the braking amplitude is determined to reduce the peak amplitude of the BEMF signal during a subsequent cycle of the BEMF signal.

Aspect 8: The method of any of aspects 1 to 7, wherein determining the braking amplitude comprises: determining the braking amplitude to be inversely proportional to the time length.

Aspect 9: The method of any of aspects 1 to 8, wherein controlling the control signal according to the braking amplitude comprises: setting an amplitude of the control signal to be the braking amplitude.

Aspect 10: The method any of aspects 1 to 9, wherein controlling the control signal according to the braking amplitude comprises: converting the control signal from a drive signal that increases the energy level to a braking signal that reduces the energy level by: inverting a phase of the drive signal to generate the braking signal; setting a frequency of the braking signal to a resonant frequency of the haptic feedback component that is based on the BEMF signal; setting an amplitude of the braking signal to the braking amplitude; and outputting the braking signal when the BEMF signal crosses the amplitude-based window.

Aspect 11: The method of any of aspects 1 to 10, wherein the haptic feedback component comprises a linear resonant actuator.

Aspect 12: An apparatus for wireless communication at a device, comprising a processor; memory coupled with the processor; and instructions stored in the memory and executable by the processor to cause the apparatus to perform the method of one or more aspects of aspects 1-11.

Aspect 13: A device for wireless communication, comprising a memory and one or more processors coupled to the memory, the memory and the one or more processors configured to perform the method of one or more aspects of aspects 1-11.

Aspect 14: An apparatus for wireless communication, comprising at least one means for performing the method of one or more aspects of aspects 1-11.

Aspect 15: A non-transitory computer-readable medium storing code for wireless communication, the code comprising instructions executable by a processor to perform the method of one or more aspects of aspects 1-11.

Aspect 16: A non-transitory computer-readable medium storing a set of instructions for wireless communication, the set of instructions comprising one or more instructions that, when executed by one or more processors of a device, cause the device to perform the method of one or more aspects of aspects 1-11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method comprising:
    obtaining, by a controller, a back electromotive force (BEMF) signal associated with a haptic feedback component,
        wherein the BEMF signal is generated by movement of the haptic feedback component;
    determining, by the controller, a time length for the BEMF signal to cross an amplitude-based window, the amplitude-based window being based on an amplitude of the BEMF signal being less than a threshold value,
        wherein determining the time length is based on:
            a first measurement of a natural response of the haptic feedback component based on the BEMF signal, and
            a second measurement of a forced response of the haptic feedback component when a braking signal is applied to the haptic feedback component after the BEMF signal to reduce an energy level of the haptic feedback component during a calibration process;
    determining, by the controller and based on the time length, a braking amplitude for a control signal to reduce the energy level of the haptic feedback component; and
    controlling, by the controller, the control signal according to the braking amplitude.

2. The method of claim 1, further comprising, prior to determining the braking amplitude:
    receiving haptic control information associated with controlling a haptic output of a haptic feedback device;
    identifying, from the haptic control information, a movement profile associated with the movement of the haptic feedback component; and
    determining that the movement profile indicates that stoppage of the movement of the haptic feedback component is to be initiated in a next cycle of the control signal,
        wherein the braking amplitude is determined based on the movement profile indicating that the stoppage of the movement of the haptic feedback component is to be initiated in the next cycle of the control signal.

3. The method of claim 1, wherein the BEMF signal is obtained in association with determining a resonant frequency of the haptic feedback component.

4. The method of claim 1, wherein obtaining the BEMF signal comprises:
    setting, during a BEMF measurement period of a half-cycle of the control signal, the control signal to a high-impedance setting; and
    measuring a voltage output of the haptic feedback component during the BEMF measurement period,
        wherein the BEMF signal corresponds to the voltage output of the haptic feedback component during the BEMF measurement period.

5. The method of claim 4, wherein the control signal is controlled according to the braking amplitude during a next half-cycle of the control signal, that follows the half-cycle, to reduce the energy level of the haptic feedback component.

6. The method of claim 1, wherein the time length to cross the amplitude-based window is associated with a peak amplitude of the BEMF signal.

7. The method of claim 6, wherein the braking amplitude is determined to reduce the peak amplitude of the BEMF signal during a subsequent cycle of the BEMF signal.

8. The method of claim 1, wherein determining the braking amplitude comprises:
    determining the braking amplitude to be inversely proportional to the time length.

9. The method of claim 1, wherein controlling the control signal according to the braking amplitude comprises:
    setting an amplitude of the control signal to be the braking amplitude.

10. The method of claim 1, wherein controlling the control signal according to the braking amplitude comprises:
    converting the control signal from a drive signal that increases the energy level to the braking signal that reduces the energy level by:
        inverting a phase of the drive signal to generate the braking signal;
        setting a frequency of the braking signal to a resonant frequency of the haptic feedback component that is based on the BEMF signal;
        setting an amplitude of the braking signal to the braking amplitude; and outputting the braking signal when the BEMF signal crosses the amplitude-based window.

11. The method of claim 1, wherein the haptic feedback component comprises a linear resonant actuator.

12. A controller for a haptic feedback component, comprising:
a memory; and
one or more processors operatively coupled to the memory, the memory and the one or more processors configured to:
obtain a movement profile for controlling a haptic output of the haptic feedback component using a control signal;
determine, during a half-cycle of the control signal, that an energy level of the haptic feedback component is to be reduced based on the movement profile;
determine a quantification of the energy level of the haptic feedback component, based on a time length for a back electromotive force (BEMF) signal to cross an amplitude-based window, the amplitude-based window being based on an amplitude of the BEMF signal being less than a threshold value, wherein the time length is based on:
a first measurement of a natural response of the haptic feedback component based on the BEMF signal, and
a second measurement of a forced response of the haptic feedback component when a braking signal is applied to the haptic feedback component after the BEMF signal to reduce the energy level of the haptic feedback component during a calibration process; and
adjust, based on the quantification, an amplitude of the control signal to reduce the energy level according to the movement profile.

13. The controller of claim 12, wherein the movement profile is obtained based on a calibration of the haptic feedback component that was performed prior to receiving haptic control information associated with generating the haptic output.

14. The controller of claim 12, wherein the one or more processors are configured to, when obtaining the movement profile:
perform, prior to receiving haptic control information associated with generating the haptic output, the calibration process to calibrate the control signal specifically to reduce the energy level of the haptic feedback component based on characteristics of the haptic feedback component.

15. The controller of claim 14, wherein the one or more processors, when performing the calibration process, are configured to:
calibrate the control signal for reducing the energy level based on the first measurement and the second measurement.

16. The controller of claim 12, wherein the quantification is determined when reduction of the energy level is to be initiated according to the movement profile.

17. The controller of claim 12, wherein the time length is measured during a half-cycle of the BEMF signal that corresponds to the half-cycle of the control signal.

18. The controller of claim 12, wherein the haptic feedback component comprises a linear resonant actuator.

19. A non-transitory computer-readable medium storing a set of instructions, the set of instructions comprising:
one or more instructions that, when executed by one or more processors of a controller, cause the controller to:
obtain a back electromotive force (BEMF) signal associated with a haptic feedback component,
wherein the BEMF signal is generated by movement of the haptic feedback component;
determine a time length for the BEMF signal to cross an amplitude-based window, the amplitude-based window being based on an amplitude of the BEMF signal being less than a threshold value, wherein the time length is based on:
a first measurement of a natural response of the haptic feedback component based on the BEMF signal, and
a second measurement of a forced response of the haptic feedback component when a braking signal is applied to the haptic feedback component after the BEMF signal to reduce an energy level of the haptic feedback component during a calibration process;
determine, based on the time length, a braking amplitude for a control signal to reduce the energy level of the haptic feedback component; and
control the control signal according to the braking amplitude.

20. The non-transitory computer-readable medium of claim 19, wherein the BEMF signal is obtained in association with determining a resonant frequency of the haptic feedback component.

21. The non-transitory computer-readable medium of claim 19, wherein the one or more instructions, that cause the controller to obtain the BEMF signal, cause the controller to:
set, during a BEMF measurement period of a half-cycle of the control signal, the control signal to a high-impedance setting; and
measure a voltage output of the haptic feedback component during the BEMF measurement period,
wherein the BEMF signal corresponds to the voltage output of the haptic feedback component during the BEMF measurement period.

22. The non-transitory computer-readable medium of claim 19, wherein the time length to cross the amplitude-based window is associated with a peak amplitude of the BEMF signal.

23. The non-transitory computer-readable medium of claim 19, wherein the one or more instructions, that cause the controller to determine the braking amplitude, cause the controller to:
determine the braking amplitude to be inversely proportional to the time length.

24. The non-transitory computer-readable medium of claim 19, wherein the one or more instructions, that cause the controller to control the control signal according to the braking amplitude, cause the controller to:
set an amplitude of the control signal to be the braking amplitude.

25. An apparatus, comprising:
means for obtaining a back electromotive force (BEMF) signal associated with a haptic feedback component,
wherein the BEMF signal is generated by movement of the haptic feedback component;
means for determining a time length for the BEMF signal to cross an amplitude-based window, the amplitude-based window being based on an amplitude of the BEMF signal being less than a threshold value, wherein the time length is based on:
a first measurement of a natural response of the haptic feedback component based on the BEMF signal, and a second measurement of a forced response of the haptic feedback component when a braking signal is applied to the haptic feedback component after the BEMF signal to reduce an energy level of the haptic feedback component during a calibration process;

means for determining, based on the time length, a braking amplitude for a control signal to reduce the energy level of the haptic feedback component; and means for controlling the control signal according to the braking amplitude.

26. The apparatus of claim 25, wherein the BEMF signal is obtained in association with determining a resonant frequency of the haptic feedback component.

27. The apparatus of claim 25, wherein the means for obtaining the BEMF signal comprises:

means for setting, during a BEMF measurement period of a half-cycle of the control signal, the control signal to a high-impedance setting; and means for measuring a voltage output of the haptic feedback component during the BEMF measurement period, wherein the BEMF signal corresponds to the voltage output of the haptic feedback component during the BEMF measurement period.

28. The apparatus of claim 25, wherein the time length to cross the amplitude-based window is associated with a peak amplitude of the BEMF signal.

29. The apparatus of claim 25, wherein the means for determining the braking amplitude comprises:

means for determining the braking amplitude to be inversely proportional to the time length.

30. The apparatus of claim 25, wherein the means for controlling the control signal according to the braking amplitude comprises:

means for setting an amplitude of the control signal to be the braking amplitude.

\* \* \* \* \*